(12) United States Patent
Jonsson

(10) Patent No.: US 9,404,664 B2
(45) Date of Patent: Aug. 2, 2016

(54) CONTROLLING A HEATING/COOLING SYSTEM

(75) Inventor: Ulf Jonsson, Upplands Väsby (SE)

(73) Assignee: UPONOR INNOVATION AB, Virsbo (SE)

(*) Notice: Subject to any disclaimer, the term of this patent is extended or adjusted under 35 U.S.C. 154(b) by 543 days.

(21) Appl. No.: 13/147,917

(22) PCT Filed: Feb. 16, 2010

(86) PCT No.: PCT/IB2010/050687
§ 371 (c)(1),
(2), (4) Date: Aug. 4, 2011

(87) PCT Pub. No.: WO2010/095093
PCT Pub. Date: Aug. 26, 2010

(65) Prior Publication Data
US 2011/0290328 A1    Dec. 1, 2011

(30) Foreign Application Priority Data
Feb. 18, 2009    (FI) .................................. 20095151

(51) Int. Cl.
*F24D 3/00* (2006.01)
*F24D 3/10* (2006.01)
*F24D 19/10* (2006.01)
(Continued)

(52) U.S. Cl.
CPC .......... *F24D 3/1066* (2013.01); *F24D 19/1015* (2013.01); *F24D 19/1021* (2013.01); *F25B 30/02* (2013.01); *F24D 3/18* (2013.01); *F25B 2400/04* (2013.01); *F25B 2500/07* (2013.01); *Y10T 137/0318* (2015.04); *Y10T 137/6416* (2015.04)

(58) Field of Classification Search
CPC .............. F24D 3/1066; F24D 19/1015; F24D 19/1021; F25B 30/02; F25B 2400/04
USPC ......... 165/205, 218, 267–270, 203, 206, 207, 165/208, 219, 220, 221, 283, 281; 700/302, 700/306; 62/238.7, 269.1, 234.6; 237/8 R, 237/8 A, 8 C, 2 A
See application file for complete search history.

(56) References Cited

U.S. PATENT DOCUMENTS 4,150,788 A * 4/1979 Matsumoto et al. .......... 237/8 R
4,393,662 A * 7/1983 Dirth ................................ 62/115
4,708,287 A * 11/1987 De Wit ........................ 237/8 R
(Continued)

FOREIGN PATENT DOCUMENTS

DE        3708449    9/1988
DE        4124304    1/1993
(Continued)

*Primary Examiner* — Ljiljana Ciric
*Assistant Examiner* — Antonio R Febles
(74) *Attorney, Agent, or Firm* — Occhiuti & Rohlicek LLP

(57) ABSTRACT

The invention relates to a hydronic heating/cooling system. In the system, liquid is led along a main supply pipe (1) to a supply manifold (2) and distributed in the manifold into heating loops (3). The heating loops (3) return to return manifold (4). At least one of the manifolds (2, 4) has actuators (6) for controlling the flow in the heating loops (3). At least one loop is designated to be a bypass loop. The actuators (6) in the loops (3) are monitored and it is ensured that the actuator (6) of the bypass loop is open if all the other actuators (6) are closed.

5 Claims, 1 Drawing Sheet

(51) Int. Cl.
*F25B 30/02* (2006.01)
*F24D 3/18* (2006.01)

(56) References Cited

U.S. PATENT DOCUMENTS

| | | | |
|---|---|---|---|
| 6,240,336 B1 * | 5/2001 | Brundisini | 700/284 |
| 6,345,770 B1 * | 2/2002 | Simensen | 237/69 |
| 6,390,381 B1 * | 5/2002 | Laing | 237/8 R |
| 6,708,083 B2 * | 3/2004 | Orthlieb et al. | 700/276 |
| 7,407,003 B2 * | 8/2008 | Ross | 165/295 |
| 2002/0185272 A1 * | 12/2002 | Bujak, Jr. | 165/209 |
| 2005/0039904 A1 * | 2/2005 | Aler et al. | 165/219 |
| 2007/0095931 A1 * | 5/2007 | MacDuff | 237/69 |

FOREIGN PATENT DOCUMENTS

| | | |
|---|---|---|
| DE | 10-2006-052124 | 5/2008 |
| EP | 0548389 | 6/1993 |
| EP | 1033539 | 9/2000 |
| JP | 2001004157 | 1/2001 |

\* cited by examiner

CONTROLLING A HEATING/COOLING SYSTEM

CROSS-REFERENCE TO RELATED APPLICATIONS

This application is the National Stage of International Application No. PCT/IB2010/050687, filed on Feb. 16, 2010, which claims the priority of Finland Patent Application No. 20095151, filed on Feb. 18, 2009. The contents of both applications are hereby incorporated by reference in their entirety.

BACKGROUND OF THE INVENTION

The invention relates to a method for controlling a hydronic heating/cooling system in which liquid is led along a main supply pipe to a supply manifold and distributed in the manifold into heating loops, the heating loops returning to a return manifold, and at least one of the manifolds having actuators for controlling the flow in the heating loops.

The invention further relates to a hydronic heating/cooling system comprising a main supply pipe, a main return pipe, at least one supply manifold, at least one return manifold, heating loops from the supply manifold to the return manifold, and actuators for controlling the flow in the heating loops arranged to the supply manifold and/or the return manifold.

Yet further the invention relates to a software product of a control system of a hydronic heating/cooling system in which liquid is led along a main pipe to supply manifold and distributed in the manifold into heating loops, the heating loops returning to a return manifold, and at least one of the manifolds having actuators for controlling the flow in the heating loops.

In hydronic heating systems the liquid acting as medium is typically led along a main supply pipe to a supply manifold. The heating pipes forming the actual heating loop extend from the supply manifold and, having made a loop in the space to be heated, return to a return manifold. Valves controlling the liquid flow in the heating pipes are arranged to either the supply manifold or return manifold or both. The valves are actuator-operated and the operation of the actuators is controlled by a control system. Controlling the actuators is quite complex, and it is necessary to take into consideration in the control system several things related to temperature control, reliable operation of the system, and acoustic problems caused by the system, for instance. An example of a hydronic heating system is described in the document JP 2001004157. The energy to the system can be provided by a heat pump. In such a case, the system is typically provided with a pressure controlled by-pass valve for preventing internal over-pressure in the heat pump. Another solution is to completely remove a thermostat and actuator from at least one loop such that there is always flow in one loop. Such a solution wastes energy, however.

BRIEF DESCRIPTION OF THE INVENTION

It is an object of the present invention to provide a novel solution for controlling a heating/cooling system.

The method of the invention is characterised by making at least one loop to be a bypass loop, monitoring the actuators in the loops, and ensuring that the actuator of the bypass loop is open if all the other actuators are closed.

The system of the invention is characterised in that the system further comprises a control unit for defining at least one loop to be a bypass loop, for monitoring the actuators in the loops, and for ensuring that the actuators of the bypass loop is open if all the other actuators are closed.

The software product of the invention is characterised in that the execution of the software product on a control unit of the control system is arranged to provide the following operations of defining at least one loop to be a bypass loop, monitoring the actuators in the loops, and ensuring that the actuator of the bypass loop is open if all the other actuators are closed.

The idea of the invention is that in a hydronic heating/cooling system liquid is led along a main supply pipe to a supply manifold and distributed into heating loops. The heating loops return to a return manifold. At least one of the manifolds has actuators for controlling the flow in the heating loops. At least one loop is designated to be a bypass. The actuator for this loop is open when all other actuators are closed. There is no need for a pressure-controlled bypass valve and yet there is sufficient flow in the system all the time. The system is energy efficient because there is flow in the bypass loop only when it is needed. If a heat pump is used, the solution prevents the internal pressure of the heat pump from rising too much.

BRIEF DESCRIPTION OF THE FIGURES

Some embodiments of the invention are described in greater detail in the attached drawings in which.

DETAILED DESCRIPTION OF THE INVENTION

Figure 1:
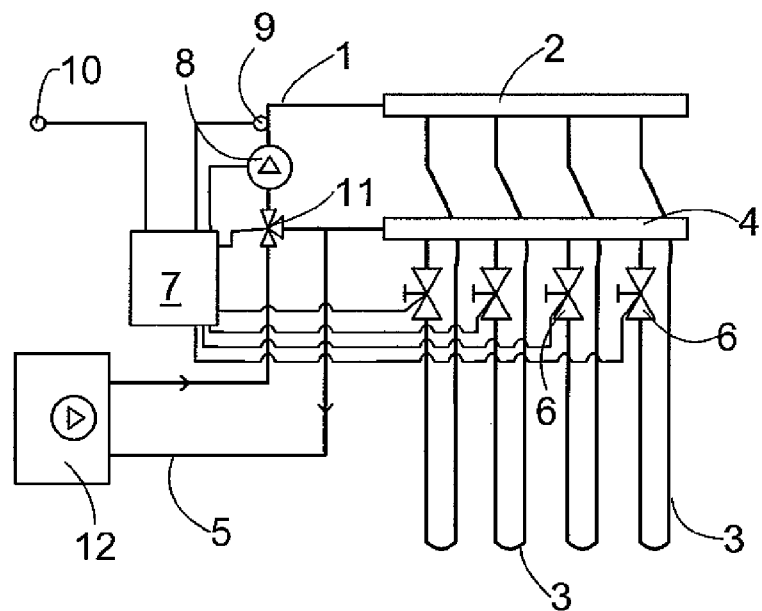
FIG. 1 is a schematic representation of a hydronic heating/cooling system.

The FIG. 1 shows a hydronic heating/cooling system. In the system, liquid is led along a main supply pipe 1 to a flow supply 2. The supply manifold 2 distributes the liquid to several heating loops 3. The heating loops 3 make the liquid to flow through the rooms or spaces to be heated or cooled. If the system is used for heating, the liquid can be warm water, for example. On the other hand, if the system is used for cooling, the liquid flowing in the pipes is cool liquid that cools the rooms or spaces.

The pipes forming the heating loops 3 return to a return manifold 4. From the return manifold 4, the liquid flows back again along a main return pipe 5.

Actuators 6 are arranged to the return manifold 4. The actuators 6 control the flow of the liquid in the loops 3.

A control unit 7 controls the operation of the actuators 6. The actuators 6 can also be arranged to the supply manifold 2. Further, there can be actuators both in the supply manifold 2 and in the return manifold 4. Either one of the manifolds 2 and 4 can further comprise balancing valves. The balancing valves can be manually operated, for example.

The system can also comprise a circulation pump 8 and a connection between the main supply pipe 1 and the main return pipe, the connection being provided with a mixing valve 11. A separate circulation pump 8 and/or a connection between the pipes 1 and 5 is, however, not always necessary.

The control unit 7 measures the temperature of the liquid by a temperature sensor 9. The outside temperature is also measured by a temperature sensor 10. The control unit 7 can control the temperature of the liquid in the main flow pipe 1 on the basis of the outside temperature, for example. The control unit 7 can control the temperature of the liquid in the main flow pipe 1 by controlling the mixing valve 11, for example.

A heat pump 12 acts as an energy source for the system. Instead of a heat pump 12 the energy source can be any other suitable energy source, such as a boiler, for example.

The control unit 7 can comprise a zone controller part that controls the actuators 6 and the circulation pump and a primary controller part which controls the mixing valve 11, for example. In such a case, the zone controller part and the primary controller part are connected by a bus, for example.

A hydronic under floor heating system distributes the needed heating to each room in the building by controlling the hot water flow through a heating loop in the floor. Normally, one loop per room is used but sometimes a large room is split into two or more loops. The controller will act on the information from the room thermostat and accordingly turn the water flow on or off in the floor loop.

The floor loop or heating loop piping is typically made of cross-linked polyethylene plastic pipes, for example. These pipes can be used in different types of floor constructions, i.e., both concrete and wooden floors can be heated this way. It is essential that the insulation, under the pipes, in the floor construction is good to avoid the leakage of energy out downwards. The floor loop layout depends on the heat demand for each room.

In a concrete floor, typically 20-mm pipes are used, the pipes being usually attached to a re-enforcing net before the final concrete casting. The recommendation is that the top of the pipes should be 30 to 90 mm below the concrete surface and the pipe loops should be placed at a 300-mm center distance. Concrete conducts heat well, so this layout will lead to an even distribution of energy and give an even temperature on the floor surface. This building method using concrete and 20-mm pipes is an economical way of building a UFH (under-floor heating) system.

Due to the good thermal conduction in concrete, the loop can be fed with low supply temperature, normally below 35 degrees Celsius.

The step response is quite slow due to the large mass of the floor, normally between 8 to 16 h depending on the floor thickness.

In wooden floors there are some different construction techniques available and we can divide them into two main categories: floor loops inside the floor construction or on top of the floor construction. It is to be noted that all UFH wood construction techniques use aluminum plates to distribute the heat from the pipes. This compensates for the poor heat conduction in wood. Generally speaking, all "in floor" constructions use 20-mm pipes and the "on floor" technique uses 17-mm pipes that are mounted in pre-grooved floorboards. However, it is self-evident to a person skilled in the art that the diameter of the pipes can also be different and it is determined according to the need and/or requirements set by the system and/or environment.

Due to the poor thermal conduction in a wooden floor, the loops need a higher supply temperature than a concrete floor, normally up to 40 degrees Celsius.

The step response is quicker than for concrete, normally between 4 to 6 h depending on the floor construction.

The previously mentioned systems are primarily installed when a house is built. In addition to these, there are UFH systems for after installation. This system focuses on a low building height and the ease of handling, and uses smaller pipe diameters, and the pipes are mounted in pre-grooved polystyrene floor panels. The supply temperature and step response are quite similar to those of wooden constructions.

The stroke cycle of the actuator is preferably less than 120 seconds. The actuator can be a conventional mechanical piston valve. The actuator can also be, for example, a solenoid valve. When using a solenoid valve. the stroke time of the actuator can be very short. Thus, the stroke time or operating time of the actuator can be for example in the range of 0.1 to 120 seconds. Preferably actuators with fast operating time are used. Thus, the operating time of the actuators is preferably less than 10 seconds.

In the control system, the term "pulse width" refers to the on time of the flow i.e. the duty cycle. A minimum pulse width is preferred in order to achieve efficient heating. However, the minimum pulse width is preferably determined such that during the duty cycle the longest loop is also filled with supply water. The minimum pulse width means that the time frame of control is quite short, which means high frequency. Preferably, the time frame is shorter than $\frac{1}{3}$ of the response time of the floor in the room to be heated. The time frame may vary for example between 5 and 60 minutes. In order to achieve the feature that the duty cycles start at different moments in different loops, the length of the off-times between the duty cycles can be varied using a pattern or randomly. The variation must naturally be carried out within certain limits, such that the percentage of the duty cycles can be kept at a desired value. Another option is to vary the pulse width using a pattern or randomly in a corresponding manner. Yet another option is to use different time frames in different loops. For example, in one loop the time frame can be 29 minutes, in a second loop the time frame can be 30 minutes and in third loop the time frame can be 31 minutes. Of course sometimes the duty cycles start simultaneously in different loops but using at least one of the above-mentioned systems, the duty cycles start at different moments in most cases. Thus, the object is to prevent the duty cycles in different loops from running synchronously.

The percentage of the duty cycle means how long the on-state of the time frame is. In other words, if the time frame is 10 minutes and the percentage of the duty cycle is 10%, it means that the flow is on for 1 minute and off for 9 minutes, if the percentage is 50 the flow is on for 5 minutes and off for 5 minutes and if the percentage of the duty cycle is 90, the flow is on for 9 minutes and off for 1 minute off. If the time frame is short enough, control can be considered continuous if the system is slow enough, i.e., the response time of the floor is long.

This specification refers to hydronic under surface heating/cooling. In such a system, liquid is supplied to supply loops for cooling/heating. The liquid can be for example water or any other suitable liquid medium. The liquid may comprise glycol, for example. Under surface heating/cooling means that the supply loops are installed under the floor, for example. The supply loops can also be installed in any other suitable structure. The loops may be installed in the wall or ceiling, for example.

In an embodiment an on/off control is combined with pulse width modulation per room. The pulse width depends on the response in the room. At the startup the pulse width is preferably always 50%. The time frame for the pulse width can be 30 minutes, for example. It is important to prevent the different channels/loops from running synchronously. Adding a random value of −30 to +30 seconds to the time frame can prevent this. Another possibility is to have a slightly different time frame for each channel/loop. It is enough if the difference is 5 seconds, for example.

The maximum value for the pulse width is 25 minutes and the minimum value is 5 minutes. The resolution can be 1 minute, for example. Preferably, the pulse width modulation counter is reset the by a change of a set point which prevents delays in the system.

A heating cycle is defined as the time between one heating request and the next heating request.

Maximum and minimum room temperatures are monitored and saved during a full heating cycle.

The pulse width is adjusted at timeout, at heat-up modes or after a heating cycle.

The master timeout for pulse width adjustment can be for example 300 minutes.

The control system comprises an appropriate means for performing the desired functions. For example, a channel block calculates the control signal based on the set point, the room temperature and the energy required. The energy is pulse width modulated and the energy requirement is calculated by measuring the characteristics of the room temperature over time.

One way to describe this is that it is a traditional on/off control with self-adjusting gain.

In an embodiment, the pulse width modulation output can be adjusted between 15 to 70% of the duty cycle. The start value is 50%. The maximum and minimum values during an on/off cycle are stored and evaluated and the duty cycle is adjusted if needed.

The pulse width modulation timer is restarted if the set point increases more than 1 degree.

If all the loops 3 are closed by the actuators 6, this would cause internal over-pressure in the heat pump 12. This could cause an over-pressure alarm or even harm the heat pump 12 before its power output is adjusted. Typically this is prevented by a pressure-controlled bypass valve which opens when the pressure rises too much and leads liquid through a bypass pipe. Another used method is to remove the actuator from one loop and thus always have flow in one loop. In the system described below, another solution is used, however. In the system, one designated room per control unit 7 is used as a bypass. This means that the actuators 6 for this room are open when all other actuators are closed. This ensures that sufficient flow exists in the system and thus ensures good operating conditions for the heat pump 12. The by-pass function provides a sufficient load in the heat pump 12 whereby internal overpressure in the heat pump 12 is avoided. Preferably the room which is designated to be the bypass is a small room, such as a toilet, a corridor or a bathroom. Only one loop 3 then supplies the room and thus only one loop needs to be used as a bypass.

If a larger room having two or more loops is used as a bypass, then preferably all the loops are used as the bypass. This ensures even temperature in the room. In this case, too, only one loop would be enough but this could cause unevenness in the surface temperature in the room leading to inconvenience in the room. The minimum requirement is that at least one loop is used as a bypass per a heat pump 12.

It is also possible to designate two or more loops which supply different, typically small, rooms to be bypass loops. Preferably, when a loop is designated to be a bypass loop it is kept as the bypass thereafter. If then the temperature rises in the room the bypass loop supplies it is easy to adjust the temperature of the liquid flowing in the loop, for example.

The solution can be also described such that at least one loop 3 is made to be a bypass. The control unit 7 monitors the actuators 6. If the control unit 7 detects that all the other actuators 6 are closed such that there is no flow in respective loops 3, the control unit ensures that the actuator of the bypass loop 3 is open. Thus, the control unit opens the actuator and keeps it open, or if the actuator is already open, it keeps it open. The actuator of the bypass loop is kept open until at least one other actuator is opened. In the system all the loops 3 are provided with actuators 6.

Figure 2:
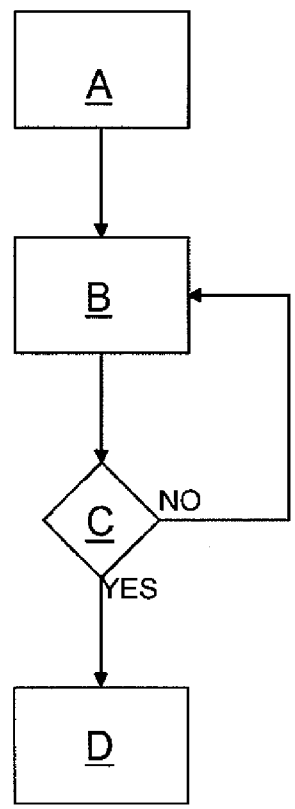
FIG. 2 is a flow chart describing an operation of a control system controlling a hydronic heating/cooling system.

FIG. 2 is a flow chart according to the operation of the above-described control system. In block A at least one loop 3 is defined to be a bypass loop. In block B the actuators 6 of the loops are monitored. In block C it is analyzed are all the actuators going to close. If the result of this analyzation "no", the loop returns to block B. However, if the actuators are going to close, the procedure continues to block D. Block D comprises the step of ensuring that the actuator of the bypass loop 3 is open.

The control unit 7 can also determine beforehand the moment when all the other actuators 6 are closed and give an opening command to the bypass actuator so early that the bypass actuator is open before the other actuators are closed. The control unit can also add a delay to a duty cycle of a closing actuator such that there is time for the bypass actuator to open before the closing actuator starts to close. The length of the delay is at least as long as the operating time of the actuators 6.

The control unit 7 can comprise a software product whose execution on the control unit 7 is arranged to provide at least some of the above-described operations. The software product can be loaded onto the control unit 7 from a storage or memory medium, such as a memory stick, a memory disc, a hard disc, a network server, or the like, the execution of which software product in the processor of the control unit or the like produces operations described in this specification for controlling a hydronic heating/cooling system.

The above-described bypass solution can also be used even if the energy source of the system is not a heat pump. Thus, the bypass solution is used if there is some need for a continuous minimum flow in the system. Such a need may be, for example, in such a case that a distance between the energy source and the manifolds 2 and 4 is long.

In some cases the features described in this application can be used as such regardless of other features. The features described in this application may also be combined as necessary to form various combinations.

The drawings and the related description are only intended to illustrate the idea of the invention. The invention may vary in detail within the scope of the claims.

The invention claimed is:

1. A method for controlling an under surface hydronic heating/cooling system for heating/cooling a plurality of rooms in which liquid is led along a main supply pipe to a supply manifold and distributed in the manifold into under surface heating loops, the under surface heating loops returning to a return manifold, and at least one of the manifolds having actuators for controlling the flow in the under surface heating loops, the method comprising:

providing at least one under surface heating loop of said under surface heating loops in each of said plurality of rooms to heat/cool said rooms, modulating a duration of a duty cycle in each said under surface heating loop such that during a duty cycle for each under surface heating loop a flow is on and between duty cycles for each under surface heating loop the flow is off, making at least one of said under surface heating loops in one of said rooms to be a bypass loop, monitoring the actuators in the under surface heating loops, including determining whether the actuators for each of the under surface heating loops is in the open or closed position, and causing the actuator of the bypass loop to be in the open position when the actuators for all of the other under surface heating loops, other than the bypass loop, are in the closed position and causing the actuator of the bypass loop to remain in the open position until at least one of the actuators of the other under surface heating loops is opened.

2. A method according to claim 1, when the actuator of the bypass loop is in the closed position and at least one actuator of the other under surface heating loops is in the open position, further comprising determining when said at least one actuator of the other under surface heating loops is about to receive a close command, and causing the actuator of the bypass loop to open before the at least one actuator of the other under surface heating loops is closed.

3. A method according to claim 2, comprising adding a delay to a duty cycle of said at least one actuator of the other under surface heating loops such that there is time for the actuator of the bypass loop to open before the closing of said at least one actuator of the other under surface heating loops.

4. A method according to claim 1, comprising using actuators with operating times less than 120 seconds.

5. A method according to claim 1, wherein a heat pump is used as an energy source for the system and an internal over-pressure in the heat pump is prevented by liquid flow in the bypass loop.

* * * * *